(12) United States Patent
Davis

(10) Patent No.: US 11,261,825 B2
(45) Date of Patent: Mar. 1, 2022

(54) THERMOPLASTIC ACOUSTIC BLOCKER DOOR

(71) Applicant: ROHR, INC., Chula Vista, CA (US)

(72) Inventor: Jennifer Davis, La Jolla, CA (US)

(73) Assignee: Rohr, Inc., Chula Vista, CA (US)

(*) Notice: Subject to any disclaimer, the term of this patent is extended or adjusted under 35 U.S.C. 154(b) by 216 days.

(21) Appl. No.: 16/140,318

(22) Filed: Sep. 24, 2018

(65) Prior Publication Data

US 2020/0095955 A1 Mar. 26, 2020

(51) Int. Cl.
| | |
|---|---|
| *F02K 1/72* | (2006.01) |
| *B29C 43/36* | (2006.01) |
| *B29C 43/02* | (2006.01) |
| *B29C 65/00* | (2006.01) |
| *F02K 1/76* | (2006.01) |
| *B29L 31/00* | (2006.01) |

(52) U.S. Cl.
CPC .............. *F02K 1/72* (2013.01); *B29C 43/021* (2013.01); *B29C 43/36* (2013.01); *B29C 66/7254* (2013.01); *F02K 1/763* (2013.01); *B29C 2043/366* (2013.01); *B29C 2043/3665* (2013.01); *B29L 2031/7504* (2013.01); *F05D 2230/232* (2013.01); *F05D 2250/283* (2013.01); *F05D 2260/96* (2013.01)

(58) Field of Classification Search
CPC ... F02K 1/62; F02K 1/625; F02K 1/70; F02K 1/72; F02K 1/80; F02K 1/827; F01N 3/0222; F01N 3/0228; F01N 3/022; F01N 2530/18; F01N 13/1861; B64C 43/36; B64C 2043/144
See application file for complete search history.

(56) References Cited

U.S. PATENT DOCUMENTS

| | | | | |
|---|---|---|---|---|
| 10,336,011 | B2* | 7/2019 | Bieder | B32B 5/245 |
| 2002/0158371 | A1* | 10/2002 | Winget | B29C 43/36 |
| | | | | 264/553 |
| 2005/0147790 | A1* | 7/2005 | Levavasseur | E04C 2/328 |
| | | | | 428/116 |
| 2012/0099980 | A1* | 4/2012 | Nishita | F04D 29/023 |
| | | | | 415/200 |
| 2014/0186166 | A1* | 7/2014 | Kostka | F01D 5/143 |
| | | | | 415/182.1 |

(Continued)

FOREIGN PATENT DOCUMENTS

| | | |
|---|---|---|
| EP | 3128163 | 2/2017 |
| EP | 3290195 | 3/2018 |
| WO | 9619656 | 6/1996 |

OTHER PUBLICATIONS

European Patent Office, European Search Report dated Feb. 4, 2020 in Application No. 19191136.1.

*Primary Examiner* — Andrew H Nguyen
(74) *Attorney, Agent, or Firm* — Snell & Wilmer L.L.P.

(57) ABSTRACT

A method for manufacturing a thrust reverser blocker door may comprise thermoforming a sandwich panel comprising a facesheet, a backsheet, and a honeycomb core. The method may further comprising overmolding a mounting structure onto the backsheet. The first thermoplastic material may comprise a continuous fiber reinforced thermoplastic composite material. The second thermoplastic material may comprise a discontinuous fiber reinforced thermoplastic composite material.

12 Claims, 12 Drawing Sheets

(56) References Cited

U.S. PATENT DOCUMENTS

| | | | |
|---|---|---|---|
| 2014/0341759 A1* | 11/2014 | Calico | H02K 1/185 |
| | | | 417/349 |
| 2015/0050446 A1* | 2/2015 | Stamp | B29C 43/52 |
| | | | 428/73 |
| 2015/0090524 A1 | 4/2015 | Leretour et al. | |
| 2018/0056554 A1* | 3/2018 | Gaw | B29C 33/0033 |
| 2018/0058373 A1 | 3/2018 | Gaw et al. | |

* cited by examiner

THERMOPLASTIC ACOUSTIC BLOCKER DOOR

FIELD

This disclosure relates generally to gas turbine engines, and more particularly to methods for manufacturing thrust reverser blocker doors for thrust reverser assemblies.

BACKGROUND

A thrust reverser blocker door may move to a deployed position, blocking fan duct air and causing reverse thrust. A pressure of the fan duct air may act on the blocker door in response to the blocker door moving to the deployed position.

SUMMARY

A thrust reverser blocker door is disclosed, comprising a body portion comprising a facesheet, a backsheet, and a honeycomb core, and a mounting structure coupled to the backsheet, wherein at least one of the facesheet and the backsheet comprises a first thermoplastic material and the mounting structure comprises a second thermoplastic material.

In various embodiments, the first thermoplastic material comprises a continuous fiber reinforced thermoplastic composite material.

In various embodiments, the second thermoplastic material comprises a discontinuous fiber reinforced thermoplastic composite material.

In various embodiments, the mounting structure is interdiffused with the backsheet via an overmolding process.

In various embodiments, the thrust reverser blocker door further comprises a plurality of openings disposed in the facesheet.

In various embodiments, the plurality of openings are in fluid communication with the honeycomb core.

In various embodiments, the thrust reverser blocker door further comprises a close-out coupled around a perimeter of the thrust reverser blocker door.

A method for manufacturing a thrust reverser blocker door is disclosed, comprising thermoforming a sandwich panel, the sandwich panel comprising a facesheet, a backsheet, and a honeycomb core disposed between the facesheet and the backsheet, and overmolding a mounting structure onto the backsheet.

In various embodiments, at least one of the facesheet and the backsheet comprises a first thermoplastic material and the mounting structure comprises a second thermoplastic material.

In various embodiments, the thermoforming comprises applying heat to the sandwich panel, placing the sandwich panel into a first mold, and compressing the sandwich panel to shape in the first mold.

In various embodiments, the overmolding comprises injecting a flow of the second thermoplastic material into a cavity disposed between at least one of the facesheet and the backsheet and the first mold.

In various embodiments, the overmolding comprises injecting a flow of the second thermoplastic material into a cavity disposed between at least one of the facesheet and the backsheet and a first mold.

In various embodiments, the second thermoplastic material is interdiffused with at least one of the facesheet and the backsheet in response to the flow of the second thermoplastic material being injected into the cavity.

In various embodiments, the method further comprises perforating the facesheet.

In various embodiments, the overmolding comprises removing the sandwich panel from the first mold, placing the sandwich panel into a second mold, and injecting a flow of the second thermoplastic material into a cavity disposed between the backsheet and the second mold.

In various embodiments, the method further comprises coupling a close-out along a perimeter of the sandwich panel.

A method for manufacturing a thrust reverser blocker door is disclosed, comprising thermoforming a sandwich panel, the sandwich panel comprising a facesheet, a backsheet, and a honeycomb core, wherein the thermoforming includes applying heat to the sandwich panel, placing the sandwich panel into a first mold, and compressing the sandwich panel in the first mold.

In various embodiments, the facesheet, the backsheet, and the honeycomb core are simultaneously deformed in response to the sandwich panel being compressed in the first mold.

In various embodiments, the method further comprises perforating the facesheet of the sandwich panel.

In various embodiments, the method further comprises coupling a close-out around a perimeter of the sandwich panel.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
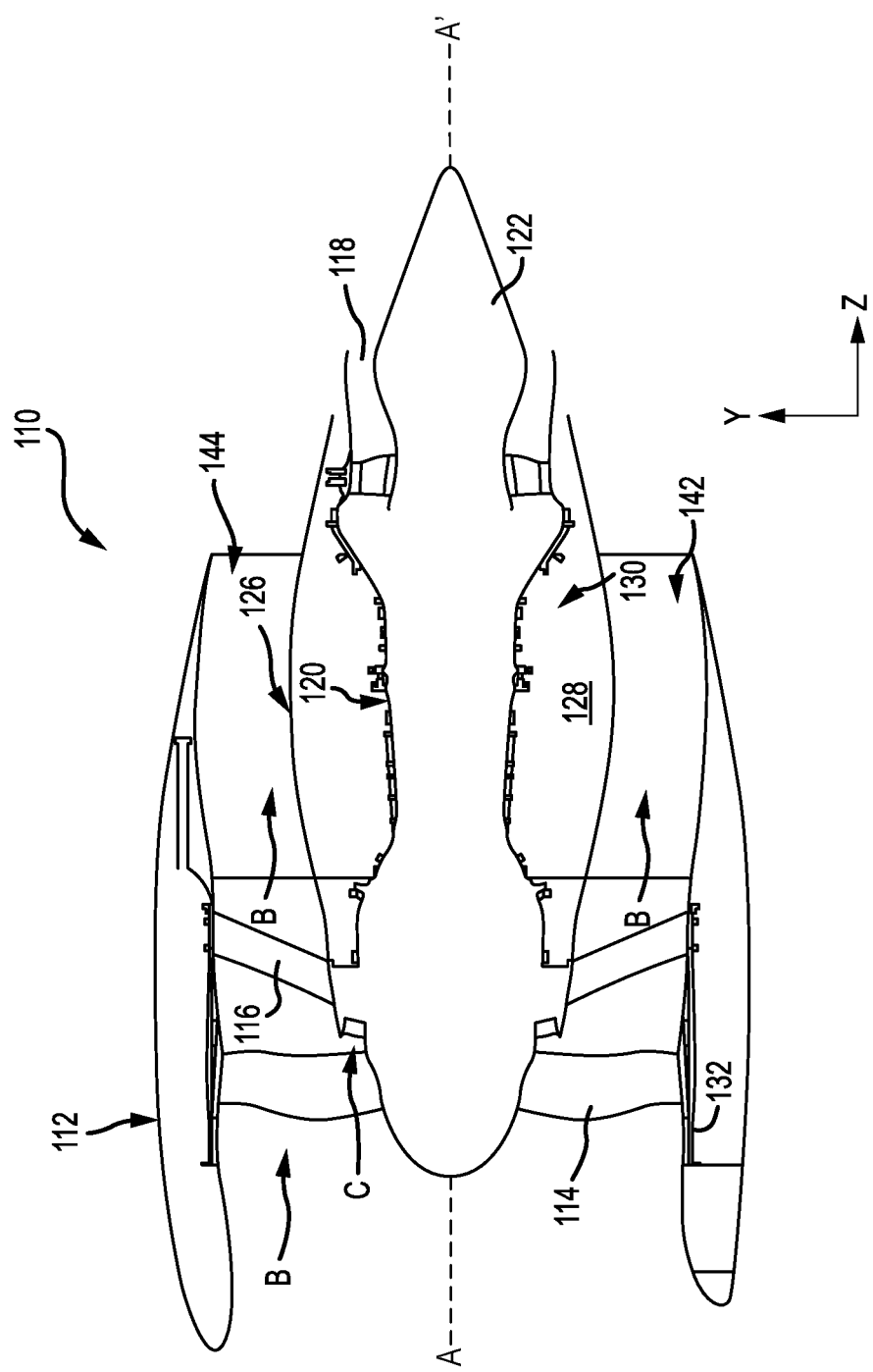
FIG. 1 illustrates a gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Methods for manufacturing a blocker door are disclosed herein. In various embodiments, a method for manufacturing a blocker door includes thermoforming the blocker door from a sandwich panel comprising a facesheet, a backsheet, and a honeycomb core. The method may further include perforating the facesheet of the thermoformed sandwich panel. By thermoforming a sandwich panel having the honeycomb core already disposed between the facesheet and backsheet, the method provides design freedom and flexibility of shaping the blocker door while maximizing the acoustically treated area of the blocker door. Stated differently, the acoustically treated area of the blocker door may include substantially all areas of the blocker door where the facesheet and the backsheet are still spaced apart after being thermoformed.

In various embodiments, a method for manufacturing a blocker door includes combining a thermoforming process with an injection molding process, also referred herein as an overmolding process. In this manner, overmolding combines the high specific strength and stiffness of the continuous fibers of a thermoformed blocker door with the design freedom and flexibility of (short fiber reinforced) injection molded mounting structures. Furthermore, the method includes manufacturing the blocker door from a single-piece sandwich panel, thereby simplifying the manufacturing process and reducing cycle time and cost.

FIG. 1 illustrates a schematic view of a gas turbine engine, in accordance with various embodiments. Xyz-axes are provided for ease of illustration. Gas turbine engine 110 may include core engine 120. Core air flow C flows through core engine 120 and is expelled through exhaust outlet 118 surrounding tail cone 122.

Core engine 120 drives a fan 114 arranged in a bypass flow path B. Air in bypass flow-path B flows in the aft direction (z-direction) along bypass flow-path B. At least a portion of bypass flow path B may be defined by nacelle 112 and inner fixed structure (IFS) 126. Fan case 132 may surround fan 114. Fan case 132 may be housed within fan nacelle 112. Fan 114 may rotate about an engine centerline axis A-A'.

Nacelle 112 typically comprises two halves which are typically mounted to a pylon. According to various embodiments, multiple guide vanes 116 may extend radially between core engine 120 and fan case 132. Upper bifurcation 144 and lower bifurcation 142 may extend radially between the nacelle 112 and IFS 126 in locations opposite one another to accommodate engine components such as wires and fluids, for example.

Inner fixed structure 126 surrounds core engine 120 and provides core compartments 128. Various components may be provided in core compartment 128 such as fluid conduits and/or compressed air ducts, for example.

Figure 2A:
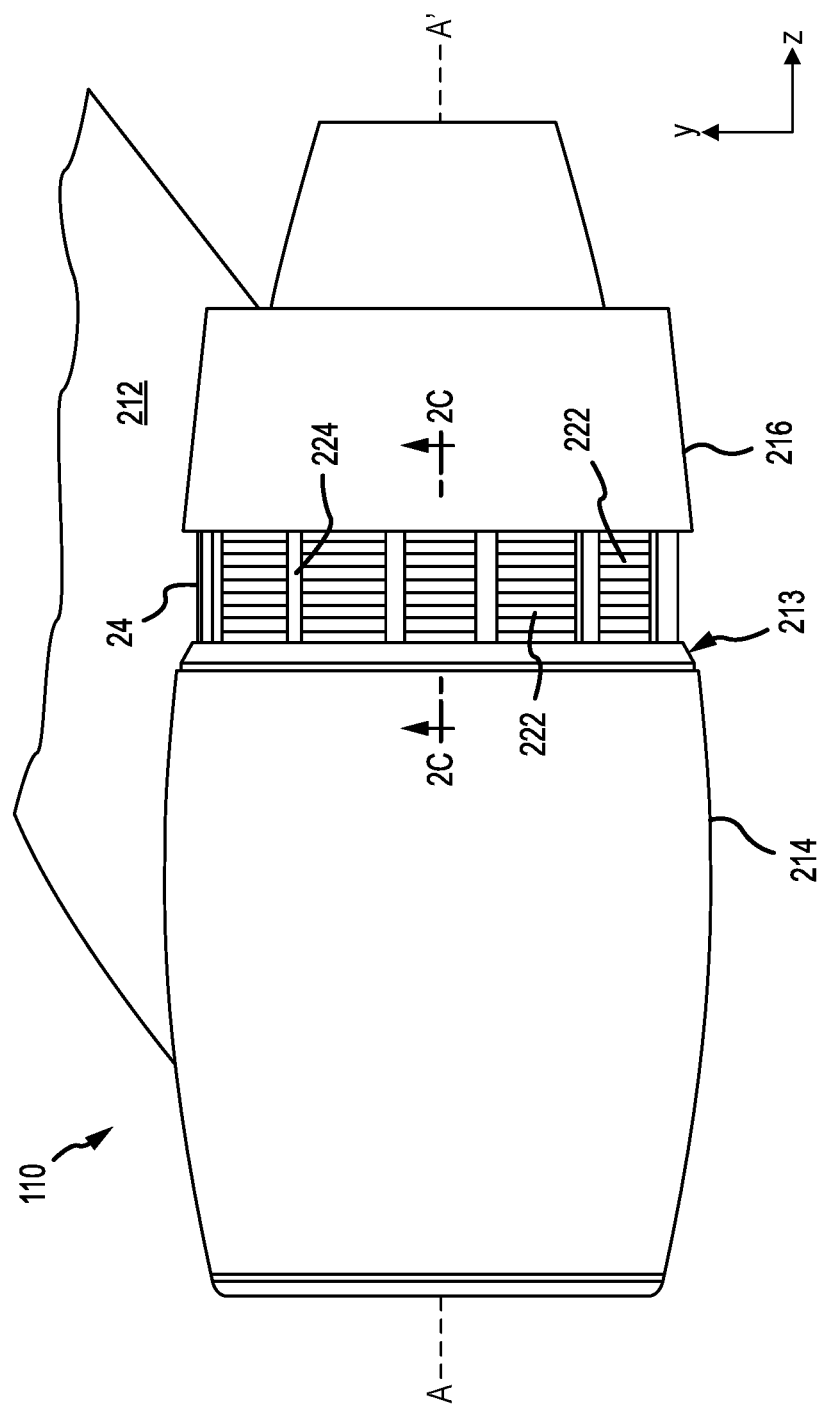
FIG. 2A illustrates a side view of a gas turbine engine with a thrust reverser in a deployed position, in accordance with various embodiments.

With reference to FIG. 2A, a side view of gas turbine engine 110 is illustrated, in accordance with various embodiments. Gas turbine engine 110 may comprise a turbofan engine. Gas turbine engine 110 may be mounted onto an aircraft by pylon 212. Gas turbine engine 110 may include segmented cowl 213 which includes nacelle body 214 and translating cowl 216 and IFS 126 (with momentary reference to FIG. 1). Translating cowl 216 is split from nacelle body 214 and translates aft to produce reverse thrust.

A plurality of cascade vane sets 222 may be uncovered in response to translating cowl 216 being translated aft as seen in FIG. 2A. Each of cascade vane sets 222 may include a plurality of conventional transverse, curved, turning vanes which turn airflow passing out from bypass flow path B (see FIG. 1) through the cascade sets in an outwardly and forwardly direction relative to gas turbine engine 110. Islands 224 are provided between cascade vane sets 222 to support the translation of translating cowl 216 and support the sides of cascade vane sets 222. In the stowed position, translating cowl 216 is translated forwardly to cover cascade vane sets 222 and provide a smooth, streamlined surface for air flow during normal flight operations.

Figure 2B:
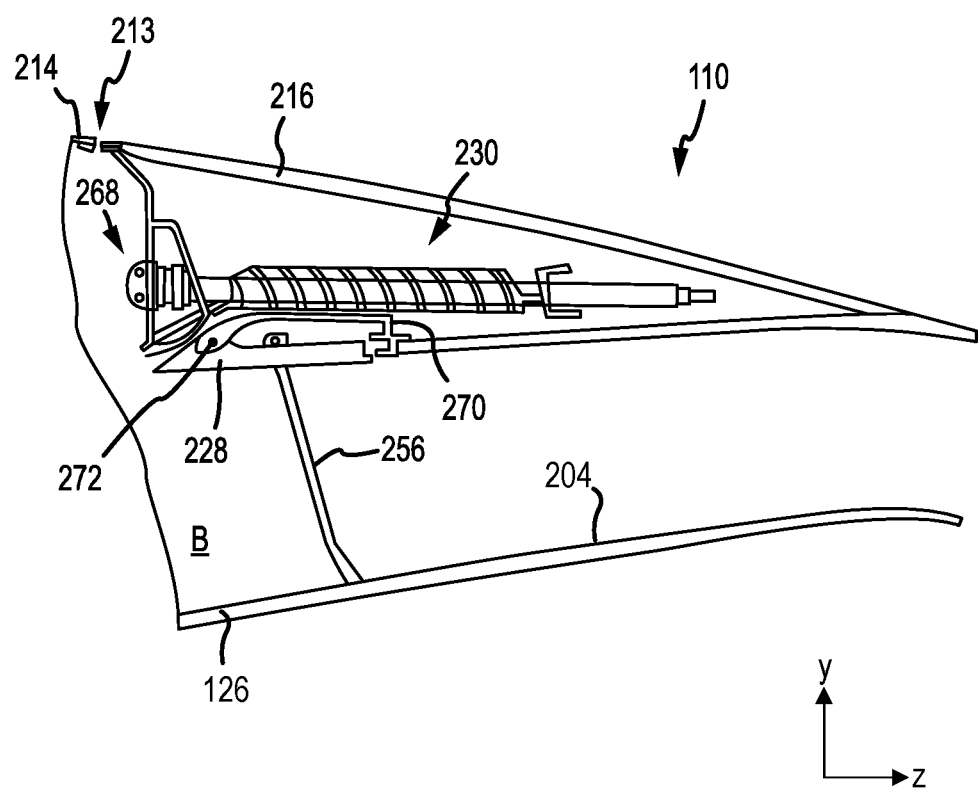
FIG. 2B illustrates a cross-section view of gas turbine engine with a blocker door in a stowed position, in accordance with various embodiments.

With reference to FIG. 2B, a cross-section view of gas turbine engine 110 with blocker door 228 in a stowed position is illustrated, in accordance with various embodiments. Cascade 230 shown in FIG. 2B is one of many cascade vane sets 222 disposed circumferentially around gas turbine engine 110 as shown in FIG. 2A. An actuator 268 may be disposed between these sets of cascades in order to drive translating cowl 216 aftward. After a thrust reversing operation is completed, actuators 268 may return blocker door 228 to the stowed position. Actuator 268 can be a ball-screw actuator, hydraulic actuator, or any other actuator known in the art. In various embodiments, multiple actuators 268 may be spaced around gas turbine engine 110 in between cascade vane sets 222. Although illustrated in FIG. 2B and FIG. 2C as being radially in-line with cascade 230, actuator 268 may be located radially inward, radially outward, or in any location relative to cascade 230.

Blocker door (also referred to herein as thrust reverser blocker door) 228 may be engaged with translating cowl 216. In various embodiments, blocker door 228 may be engaged with translating cowl 216 through bracket 270. In various embodiments, bracket 270 and translating cowl 216 may comprise a single, unitary member. Pivot 272 may be a hinge attachment between blocker door 228 and bracket 270. In various embodiments, blocker door 228 may be engaged directly to translating cowl 216 through a hinge attachment. Pivot 272 may allow blocker door 228 to rotate as translating cowl 216 moves from a stowed position to a deployed position.

Figure 2C:
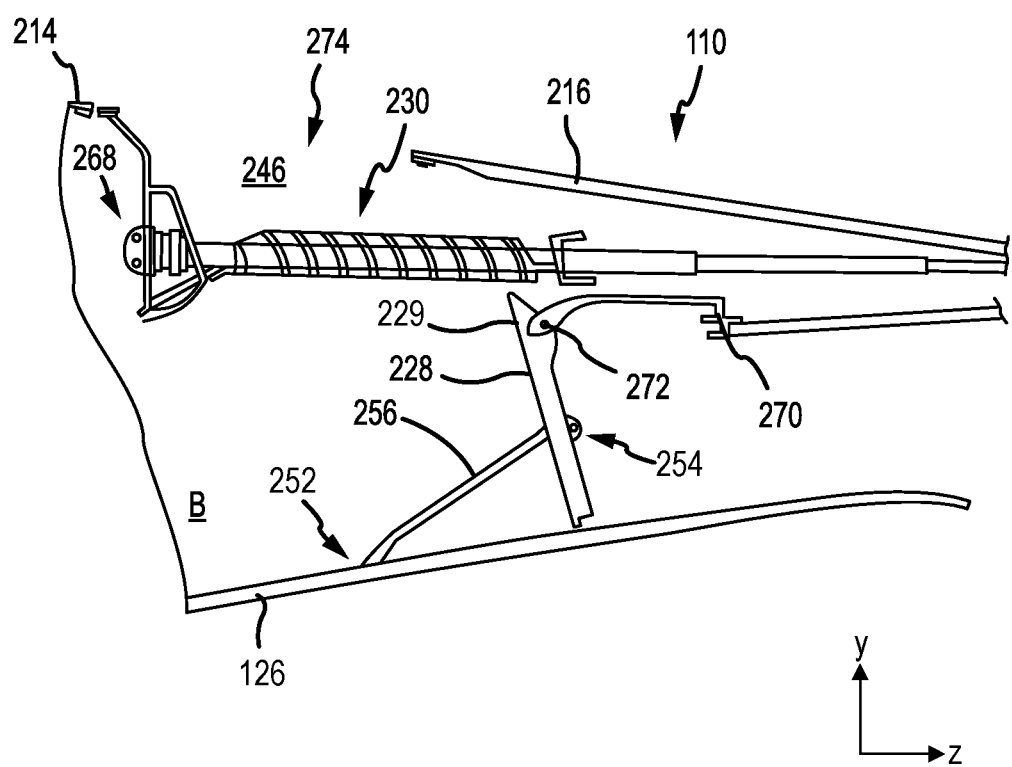
FIG. 2C illustrates a cross-section view of gas turbine engine with a blocker door in a deployed position, in accordance with various embodiments.

With combined reference to FIG. 2B and FIG. 2C, a drag link 256 may be coupled between blocker door 228 and IFS 126. Drag link 256 may be configured to pivot about a first end 252. Stated another way, first end 252 of drag link 256 may be rotatably coupled to IFS 126. Second end 254 of drag link 256 may be rotatably coupled to blocker door 228.

With respect to FIG. 2C, elements with like element numbering, as depicted in FIG. 2B, are intended to be the same and will not necessarily be repeated for the sake of clarity.

With reference to FIG. 2C, a cross-section view of gas turbine engine 110 with blocker door 228 in a deployed position is illustrated, in accordance with various embodiments. Thus, FIG. 2C shows gas turbine engine 110 in a reverse thrust mode. Blocker door 228 and its associated linkage system are responsive to translation of translating cowl 216 during a thrust reversing sequence. As noted above and with momentary additional reference to FIG. 1, FIG. 2B shows a normal or cruise mode where fan air is directed through bypass flow path B. When in reverse thrust mode or deployed position, shown in FIG. 2C, bypass flow path B is blocked by one or more circumferentially disposed blocker doors 228, interposed within bypass flow path B and collectively having a complementary geometric configuration with respect thereto, for diversion of fan air into bypass duct 246. The reverse thrust mode is achieved by aftward movement of translating cowl 216, thereby exposing outlet port 274 for airflow to escape through after the air passes into bypass duct 246. Blocker door 228 may comprise a proximal surface, or an aerodynamic surface 229.

Figure 3:
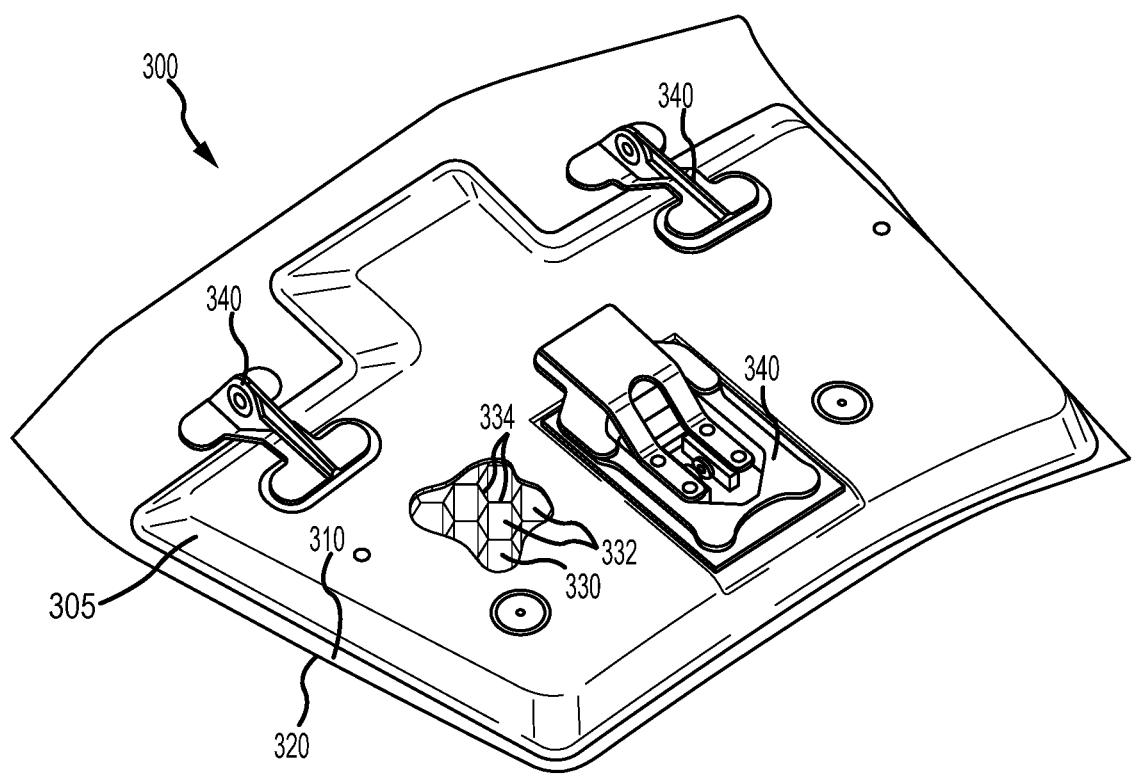
FIG. 3 illustrates a perspective view of a thrust reverser blocker door, in accordance with various embodiments.

With reference to FIG. 3, a perspective view of an exemplary blocker door 300 is illustrated, in accordance with various embodiments. Blocker door 300 may comprise a body portion 305 comprising a first skin (also referred to herein as a backsheet) 310, a second skin (also referred to herein as a facesheet 320), and a honeycomb core 330. Blocker door 300 may comprise a plurality of mounting structures 340 coupled to the backsheet 310 of body portion 305. In various embodiments, body portion 305 is manufactured as a single monolithic piece. In various embodiments, backsheet 310, facesheet 320, and honeycomb core 330 are molded from a thermoplastic material such that backsheet 310, facesheet 320, and honeycomb core 330 are monolithically formed. In various embodiments, facesheet 320 and plurality of mounting structures 340 are molded from a thermoplastic material such that facesheet 320 and plurality of mounting structures 340 are integrally formed, as will be described in further detail herein. In various embodiments, plurality of mounting structures 340 are bonded to backsheet 310 via interdiffusion during an overmolding process, as described herein. Molding of the thermoplastic material may be done by either injection molding or compression molding. In various embodiments, any thermoplastic material molding process may be used to integrally form backsheet 310, facesheet 320, and honeycomb core 330. In various embodiments, the thermoplastic material includes at least one of polyetherether ketone, polyether sulfone, polyetherkeytone keytone, polyphenylsulfone, polyphenylene sulfide, polyetherimide, and polycarbonate. In various embodiments, the thermoplastic material includes any high temperature tolerant and chemically tolerant resin.

In various embodiments, the use of thermoplastic materials allows both the cell wall height and thickness of honeycomb core 330 to be customized to meet desired specification. Furthermore, different portions of the honeycomb body portion may have different cell sizes to account for different loading or noise attenuation requirements. Such customization of the honeycomb cell size enables increased noise attenuation.

In various embodiments, plurality of mounting structures 340 are bonded to backsheet 310 via a thermoplastic ultrasonic welding process. In various embodiments, thermoplastic ultrasonic welding may be a method of joining thermoplastic components by heating and subsequent melting of surfaces which are in contact with each other. Mechanical vibration with frequency between 10 and 70 kilohertz (kHz) and amplitude of 10 to 250 micrometers (m) may be applied to joining parts. After ultrasonic energy is turned off, the parts remain in contact under pressure for a period of time while the melt layer cools down creating a weld.

In various embodiments, mounting structures 340 may comprise an attachment feature whereby blocker door 300 is mounted to a nacelle structure such as a translating cowl or an inner fixed structure for example. In various embodiments, mounting structures 340 may include an attachment feature, such as a lug or a pin for example, whereby blocker door 300 is coupled to drag link 256 (see FIG. 2A and FIG. 2B). In various embodiments, mounting structures 340 may include an attachment feature, such as a lug or a pin for example, whereby blocker door 300 is coupled to bracket 270 (see FIG. 2A and FIG. 2B). In various embodiments, mounting structures 340 may be similar to pivot 272 (see FIG. 2A and FIG. 2B).

In various embodiments, honeycomb core 330 includes a plurality of cells 332 that include a plurality of walls 334 to form each cell 332. As described above, honeycomb core 330 is customizable such that the thickness and height of walls 334 changes based on their location on body 130.

Figure 4:
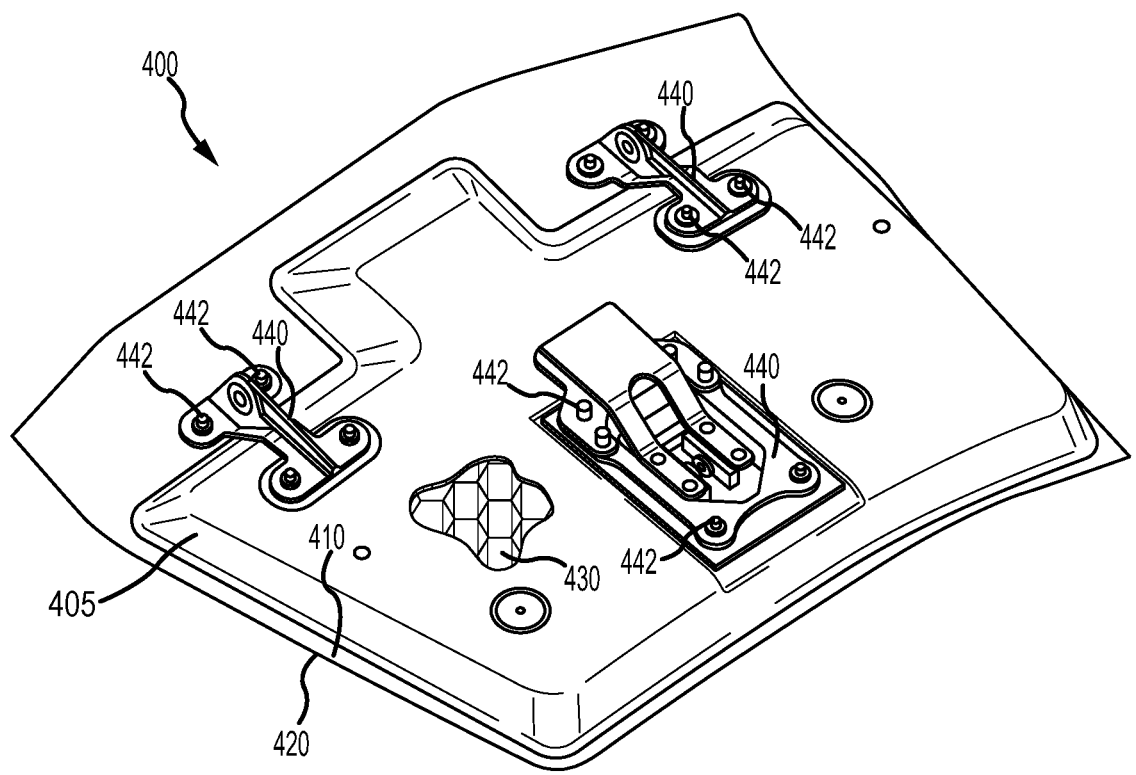
FIG. 4 illustrates a perspective view of a thrust reverser blocker door, in accordance with various embodiments.

With reference to FIG. 4, a perspective view of an exemplary blocker door 400 is illustrated, in accordance with various embodiments. Blocker door 400 may comprise a body portion 405 comprising a backsheet 410, a facesheet 420, and a honeycomb core 430. Blocker door 400 may comprise a plurality of mounting structures 440 coupled to the backsheet 410 of body portion 405. Blocker door 400 may be similar to blocker door 300 except that the mounting structures 440 of blocker door 400 are coupled to backsheet 410 via a plurality of fasteners 442, such as bolts, rivets, screws, or the like. Thus, mounting structures 440 may be coupled to backsheet 410 via interfusion during an overmolding process or may be coupled to backsheet 410 after blocker door 400 is thermoformed, as described herein with further detail.

Figure 5:
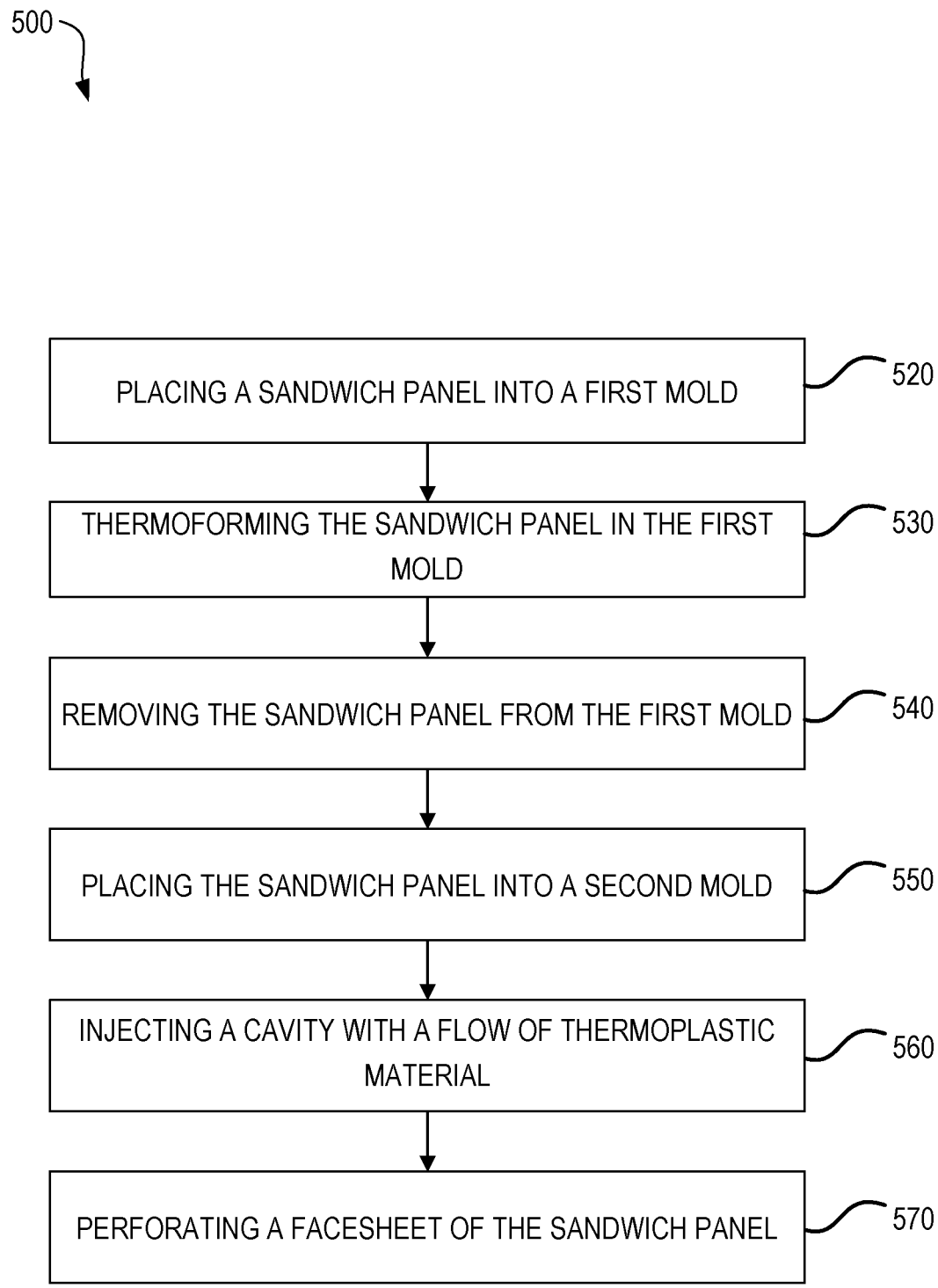
FIG. 5 illustrates a flow chart of a method for manufacturing a thrust reverser blocker door, in accordance with various embodiments.

With reference to FIG. 5, a method 500 for manufacturing a blocker door, in accordance with various embodiments. Method 500 includes thermoforming a thermoplastic composite sandwich panel into a blocker door and subsequently, or simultaneously, overmolding the thermoformed blocker door with a thermoplastic composite material to form mounting structures thereon. Method 500 includes placing a sandwich panel into a first mold (step 520). Method 500 includes thermoforming the sandwich panel in the first mold (step 530). Method 500 includes removing the sandwich panel from the first mold (step 540). Method 500 includes placing the sandwich panel into a second mold (step 550). Method 500 includes injecting a cavity with a flow of thermoplastic material (step 560). Method 500 includes perforating a facesheet of the sandwich panel (step 570).

Figure 6A:
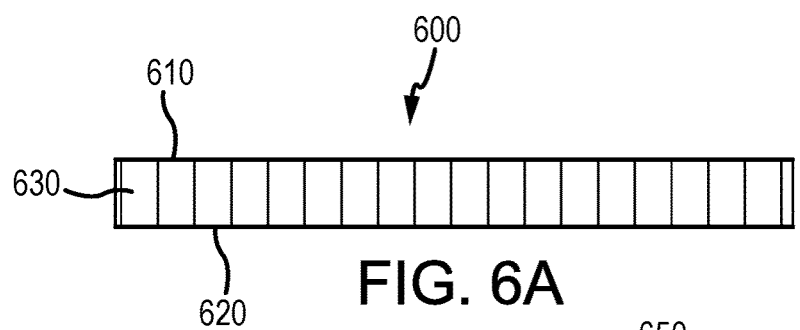
FIG. 6A, FIG. 6B, FIG. 6C, FIG. 6D, FIG. 6E, and FIG. 6F illustrate various steps in manufacturing a thrust reverser blocker door in accordance with the method of FIG. 5, in accordance with various embodiments.

With reference to FIG. 6A, a sandwich panel 600 is illustrated, in accordance with various embodiments. Sandwich panel 600 may comprise a backsheet 610, a facesheet 620, a honeycomb core 630. Sandwich panel 600 may be made from a thermoplastic. Backsheet 610, facesheet 620, and/or honeycomb core 630 may be made from a continuous fiber reinforced thermoplastic composite material (also referred to herein as a first thermoplastic material). The term "continuous fiber reinforced thermoplastic composite material" as used herein may refer to a composite material that contains continuous fibers, such as carbon fiber, glass fiber, or aramid fiber that is impregnated in a matrix of thermoplastics, such as a polycarbonate, among others. Sandwich panel 600 may be formed as a single piece. Sandwich panel 600 may be formed using injection molding, compression molding, or any other suitable manufacturing method. It is appreciated that the method of forming sandwich panel 600 is not particularly limited.

In various embodiments, sandwich panel 600 is a single degree of freedom (SDOF) acoustic panel. In various embodiments, sandwich panel 600 is a double degree of freedom (DDOF) acoustic panel. In this regard, a septum, or additional sheet, may appear in between layers of honeycomb core 630 as well as in a stack up comprising, for example, a facesheet, honeycomb core, septum, honeycomb core, and backsheet, thereby dividing one or more cells of honeycomb core 630 into two chambers, in accordance with various embodiments.

Figure 6B:
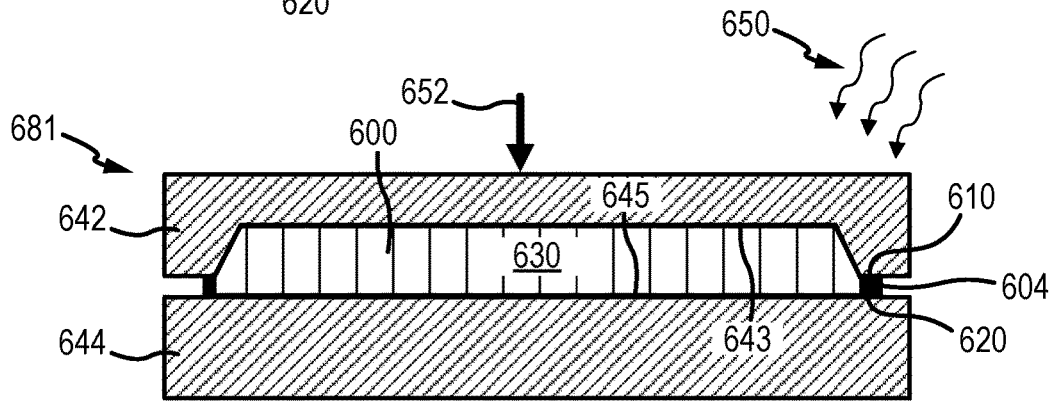

With reference to FIG. 6B, sandwich panel 600 is illustrated in a first mold 681. With combined reference to FIG. 5 and FIG. 6B, step 520 may include placing sandwich panel 600 into first mold 681. In various embodiments, first mold 681 comprises a first plate 642 and a second plate 644. Step 520 may include placing sandwich panel 600 between first plate 642 and second plate 644.

With combined reference to FIG. 5 and FIG. 6B, step 530 may include thermoforming sandwich panel 600 in first mold 681. Step 530 may include compressing sandwich panel 600 between first plate 642 and second plate 644. In this regard, a force 652 may be applied to first plate 642 thereby moving first plate 642 toward second plate 644. First plate 642 may comprise a contoured surface 643. Second plate 644 may comprise a contoured surface 645. As first plate 642 moves toward second plate 644, the sandwich panel 600 is compressed between first plate 642 and second plate 644, thereby forcing sandwich panel 600 against contoured surface 643 and contoured surface 645. Sandwich panel 600 is thereby deformed (i.e., thermoformed) in response to being compressed between first plate 642 and second plate 644 in accordance with the shape of first plate 642 and second plate 644. In this manner, backsheet 610, facesheet 620, and honeycomb core 630 (see FIG. 6A) may be simultaneously deformed during the thermoforming process. In various embodiments, backsheet 610 and facesheet 620 may be compressed together around the perimeter 604 of sandwich panel 600 to completely enclose honeycomb core 630 during the thermoforming process.

In various embodiments, step 530 may include applying heat (illustrated by arrows 650) to sandwich panel 600 such that sandwich panel 600 reaches a pliable forming temperature. In various embodiments, the heat is applied to sandwich panel 600 before it is placed between first plate 642 and second plate 644. In various embodiments, the heat is applied to sandwich panel 600 after it is placed between first plate 642 and second plate 644. In various embodiments, the heat is applied by placing sandwich panel 600 into a furnace. However, any suitable method of applying heat to sandwich panel 600 may be used. Sandwich panel 600 may be placed into first mold 681 before or after the heat is applied thereto. Once cooled, the sandwich panel 600 may retain the shape of the contoured surfaces 643, 645 of first plate 642 and second plate 644, respectively.

In various embodiments, it is contemplated that step 530 may further include applying vacuum to remove trapped air between the molds and the sandwich panel and to pull the sandwich panel into or onto the mold to form the thermoplastic to the detailed shape of the mold. In various embodiments, it is contemplated that step 530 may further include applying pressurized air to the sandwich panel to form the plastic to the detailed shape of the mold.

Figure 6C:
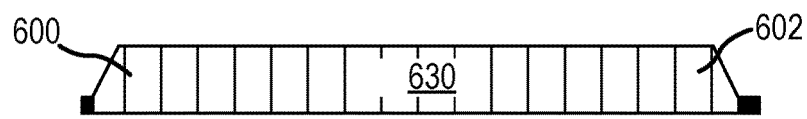

With reference to FIG. 6C, sandwich panel 600 is illustrated after being cooled and removed from the molds, now in the form of a thermoformed blocker door 602. With combined reference to FIG. 5 and FIG. 6C, step 540 may include removing the sandwich panel 600 from first mold 681.

Figure 6D:
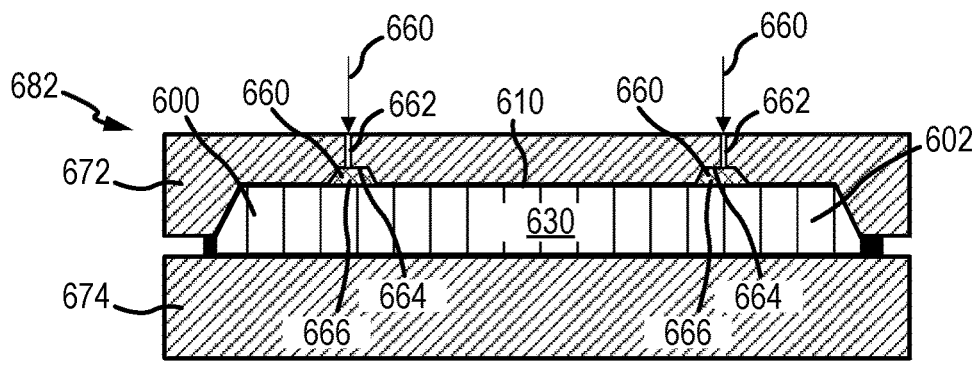

With reference to FIG. 6D, thermoformed blocker door 602 is illustrated in second mold 682. With combined reference to FIG. 5 and FIG. 6D, step 550 may include placing sandwich panel 600 into second mold 682. Step 550 may include placing sandwich panel 600 between third plate 672 and fourth plate 674. Although described as a fourth plate 674, it is contemplated herein that second plate 644 may be used in step 550, wherein the first plate 642 is replaced with the third plate 672, with momentary reference to FIG. 6B. Cavities 666 may be formed between contoured surfaces 664 of sandwich panel 600 and third plate 672 of second mold 682. Contoured surfaces 664 may be shaped in the form of a mounting structure, such as, for example, the mounting structures 340 of FIG. 3.

Figure 6E:
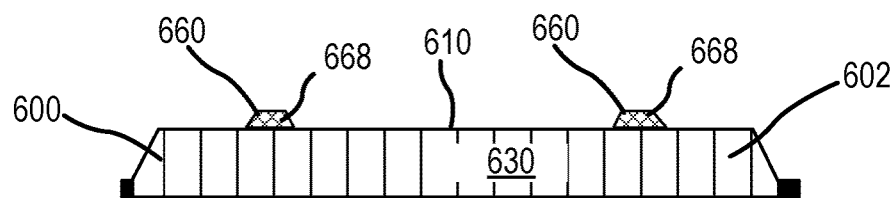

In various embodiments, step 560 may include injecting (overmolding) cavities 666 with a flow of thermoplastic material (also referred to herein as a second thermoplastic material) 660. In various embodiments, thermoplastic material 660 is a discontinuous fiber (also referred to as a short fiber) reinforced thermoplastic composite material. The term "discontinuous fiber reinforced thermoplastic material" as used herein may refer to a composite material that contains a plurality of discontinuous fibers, such as carbon fiber, glass fiber, or aramid fiber that is impregnated in a matrix of thermoplastics, such as polycarbonate, among others. Thermoplastic material 660 may comprise between 10% and 50% fiber by weight. The thermoplastic material 660 may be heated to a temperature such the that thermoplastic material 660 is melted and flows through apertures 662 disposed in third plate 672 and fills cavities 666. As the flow of thermoplastic material 660 fills cavities 666, the thermoplastic material 660 contacts sandwich panel 600 causing localized heating of sandwich panel 600 such that thermoplastic material 660 bonds with the backsheet 610 of sandwich panel 600 through adhesion and interdiffusion. It is appreciated that the type of thermoplastic material used for thermoplastic material 660 and backsheet 610 may affect the bond strength between thermoplastic material 660 and backsheet 610 during the overmolding process. In various embodiments, cavities 666 may be shaped as mounting structures, such as mounting structures 340 of FIG. 3 for example. In this regard, and with additional reference to FIG. 6E, thermoplastic material 660 that fills cavities 666 may be cooled and retain the shape of cavities 666 thereby forming mounting structures 668 on the backsheet 610 of thermoformed blocker door 602. In various embodiments, mounting structures 668 are similar to mounting structures 340 of FIG. 3.

Figure 6F:
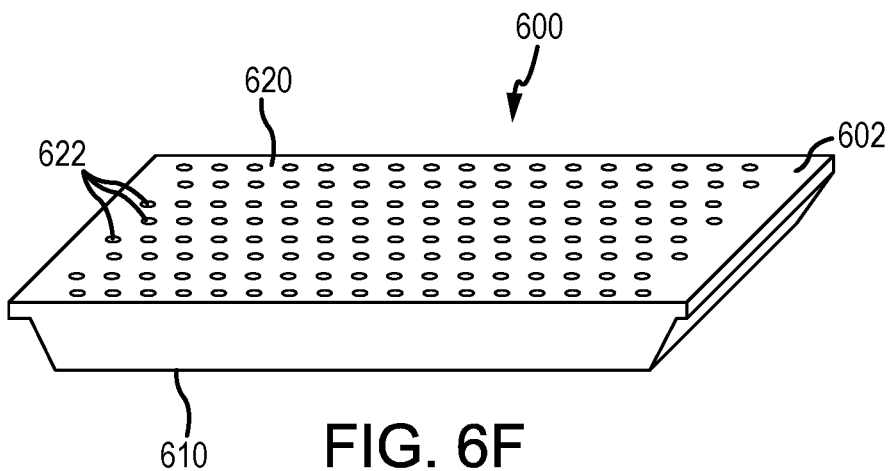

In various embodiments, with combined reference to FIG. 5 and FIG. 6F, step 570 may include perforating facesheet 620 of the sandwich panel 600. In this manner, a plurality of openings 622 may be formed into facesheet 620. The plurality of openings 622 may be in fluid communication with honeycomb core 630, with momentary reference to FIG. 6E. In this manner, blocker door 602 may be acoustically treated for attenuating noise generated during engine operation. In various embodiments, step 570 is performed using a perforation process.

Figure 7:
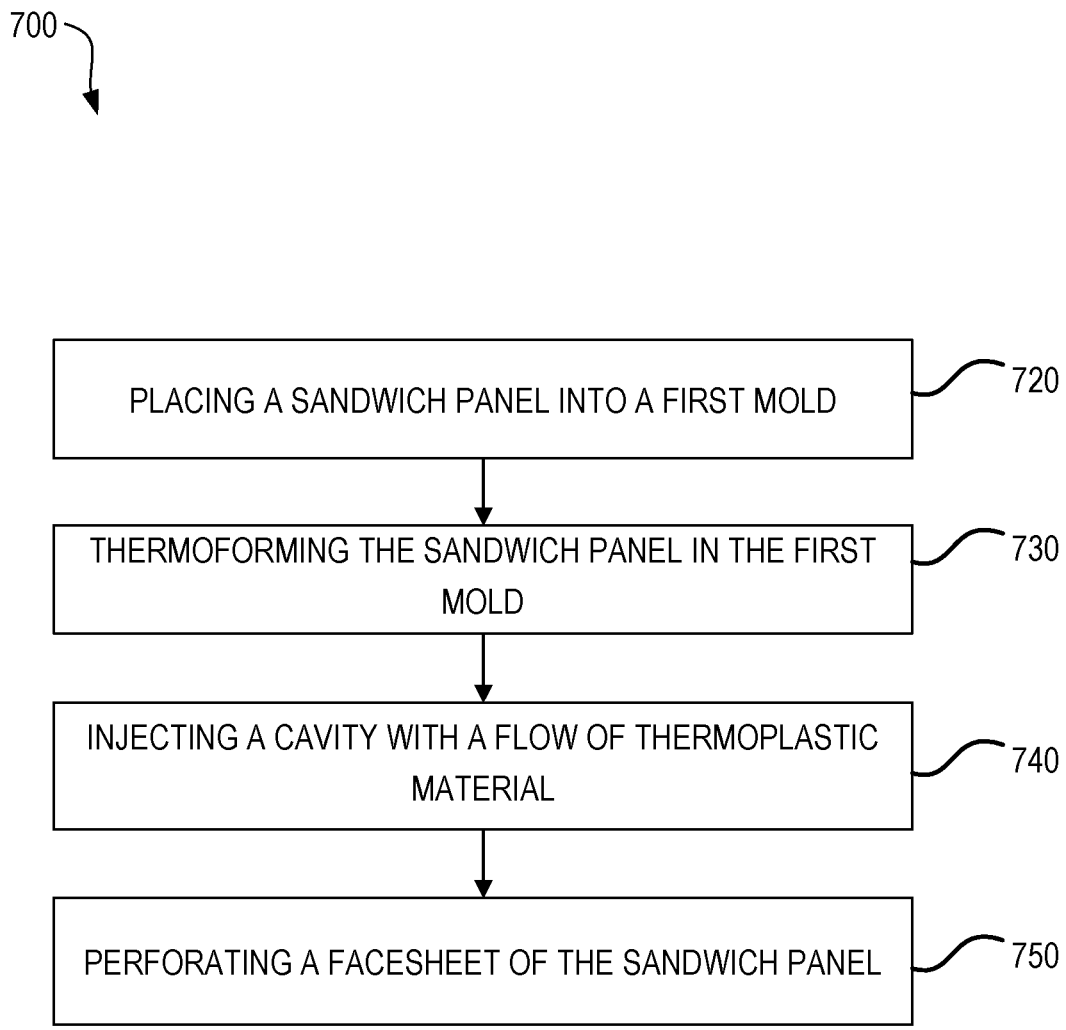
FIG. 7 illustrates a flow chart of a method for manufacturing a thrust reverser blocker door, in accordance with various embodiments.

Having described a method 500 (see FIG. 5) for manufacturing a blocker door where the blocker door is moved between separate molds for thermoforming and overmolding, respectively, and with reference now to FIG. 7, a method 700 for manufacturing a blocker door is disclosed using common molds for thermoforming and overmolding, respectively, in accordance with various embodiments. Method 700 includes thermoforming a thermoplastic composite sandwich panel into a blocker door and subsequently, or simultaneously, overmolding the thermoformed blocker door with a thermoplastic composite material to form mounting structures thereon. Method 700 includes placing the sandwich panel into a first mold (step 720). Method 700 includes thermoforming the sandwich panel in the first mold (step 730). Method 700 includes injecting a cavity with a flow of thermoplastic material (step 740). Method 700 includes perforating a facesheet of the sandwich panel (step 750).

Figure 8A:
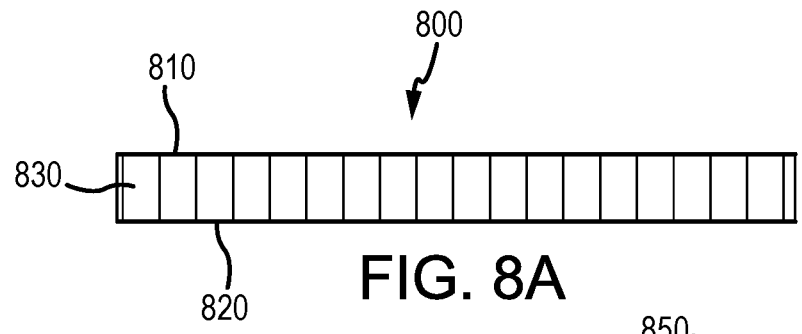
FIG. 8A, FIG. 8B, FIG. 8C, and FIG. 8D illustrate various steps in manufacturing a thrust reverser blocker door in accordance with the method of FIG. 7, in accordance with various embodiments.

With reference to FIG. 8A, a sandwich panel 800 is illustrated, in accordance with various embodiments. Sandwich panel 800 may comprise a backsheet 810, a facesheet 820, a honeycomb core 830. Sandwich panel 800 may be similar to sandwich panel 600 of FIG. 6A.

Figure 8B:
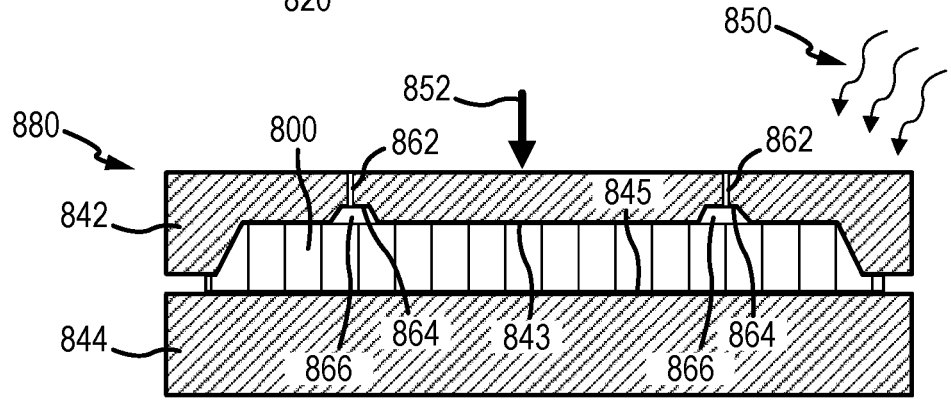

With reference to FIG. 8B, sandwich panel 800 is illustrated in a first mold 880. With combined reference to FIG. 7 and FIG. 8B, step 720 may include placing sandwich panel 800 into first mold 880. First mold 880 may include a first plate 842 and a second plate 844. Step 720 may include placing sandwich panel 800 between first plate 842 and second plate 844.

With combined reference to FIG. 7 and FIG. 8B, step 730 may include thermoforming sandwich panel 800 in first mold 880. Step 730 may include compressing sandwich panel 800 between first plate 842 and second plate 844. In this regard, a force 852 may be applied to first plate 842 thereby moving first plate 842 toward second plate 844. First plate 842 may comprise a contoured surface 843. Second plate 844 may comprise a contoured surface 845. As first plate 842 moves toward second plate 844, the sandwich panel 800 is compressed between first plate 842 and second plate 844, thereby forcing sandwich panel 800 against contoured surface 843 and contoured surface 845. Sandwich panel 800 is thereby deformed (i.e., thermoformed) in response to being compressed between first plate 842 and second plate 844 in accordance with the shape of first plate 842 and second plate 844. In this manner, backsheet 810, facesheet 820, and honeycomb core 830 (see FIG. 8A) may be simultaneously deformed during the thermoforming process.

With combined reference to FIG. 7 and FIG. 8B, step 730 may include applying heat (illustrated by arrows 850) to sandwich panel 800 such that sandwich panel 800 reaches a pliable forming temperature. In various embodiments, the heat is applied to sandwich panel 800 before it is placed between first plate 842 and second plate 844. In various embodiments, the heat is applied to sandwich panel 800 after it is placed between first plate 842 and second plate 844. In various embodiments, the heat is applied by placing sandwich panel 800 into a furnace. However, any suitable method of applying heat to sandwich panel 800 may be used. Sandwich panel 800 may be placed between first plate 842 and second plate 844 before or after the heat is applied thereto. Once cooled, the sandwich panel 800 may retain the shape of the contoured surfaces 843, 845 of first plate 842 and second plate 844, respectively.

In various embodiments, cavities 866 may be formed between contoured surfaces 864 of sandwich panel 800 and first plate 842. Contoured surfaces 864 may be shaped in the form of a mounting structure, such as, for example, the mounting structures 840 of FIG. 3.

Figure 8C:
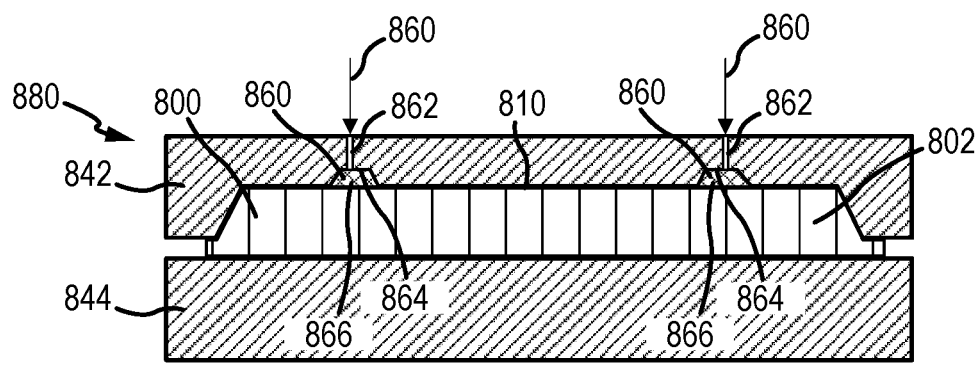

In various embodiments, with combined reference to FIG. 7 and FIG. 8C, step 740 may include injecting (overmolding) cavities 866 with a flow of thermoplastic material 860. In various embodiments, thermoplastic material 860 is similar to thermoplastic material 660 (see FIG. 6D). The thermoplastic material 860 may be heated to a temperature such the that thermoplastic material 860 is melted and flows through apertures 862 disposed in first plate 842 and fills cavities 666. As the flow of thermoplastic material 860 fills cavities 866, the thermoplastic material 860 contacts sandwich panel 800 causing localized heating of sandwich panel 800 such that thermoplastic material 860 bonds with the backsheet 810 of sandwich panel 800 through adhesion and interdiffusion. It is appreciated that the type of thermoplastic material used for thermoplastic material 860 and backsheet 810 may affect the bond strength between thermoplastic material 860 and backsheet 810 during the overmolding process. In various embodiments, cavities 866 may be shaped as mounting structures, such as mounting structures 340 of FIG. 3 for example. In this regard, and with additional reference to FIG. 8D, thermoplastic material 860 that fills cavities 866 may be cooled and retain the shape of cavities 866 thereby forming mounting structures 868 on the backsheet 810 of thermoformed blocker door 802. In various embodiments, mounting structures 868 are similar to mounting structures 340 of FIG. 3.

Figure 8D:
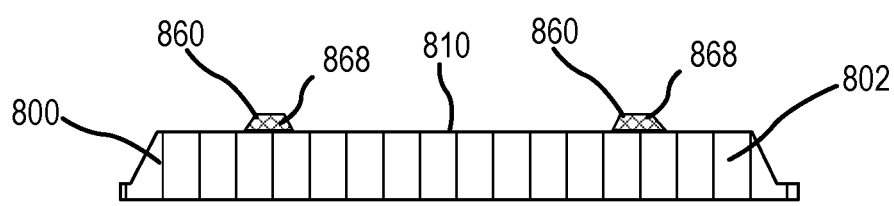

With combined reference to FIG. 7 and FIG. 8D, step 750 may be performed after step 740 is complete. Step 750 may include perforating facesheet 820 of thermoformed blocker door 802. Step 750 may be similar to step 570 of method 500 (see FIG. 5 and FIG. 6E).

Figure 9A:
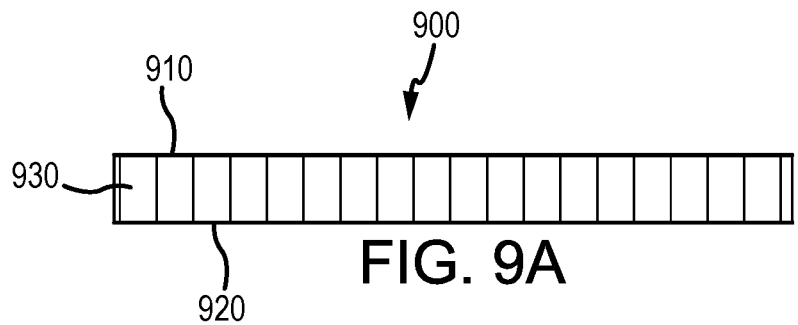
FIG. 9A, FIG. 9B, FIG. 9C, and FIG. 9D illustrate various steps in manufacturing a thrust reverser blocker door in accordance with the method of FIG. 10, in accordance with various embodiments.

With reference to FIG. 9A, a sandwich panel 900 is illustrated, in accordance with various embodiments. Sandwich panel 900 may be similar to sandwich panel 600 (see FIG. 6A). Sandwich panel 900 may comprise a backsheet 910, a facesheet 920, a honeycomb core 930. Sandwich panel 900 may be made from a thermoplastic.

Figure 9B:
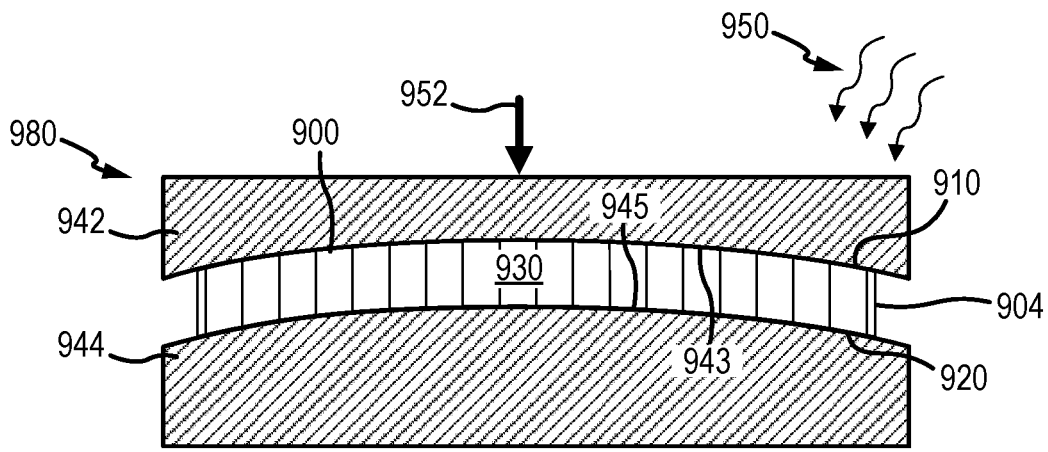

With reference to FIG. 9B, sandwich panel 900 is illustrated in a first mold 980. First mold 980 may comprise a first plate 942 and a second plate 944. With momentary reference to FIG. 10, a flow chart for a method 990 for manufacturing a blocker door is illustrated in accordance with various embodiments. With combined reference to FIG. 10 and FIG. 9B, step 992 may include placing sandwich panel 900 into first mold 980. Step 992 may include placing sandwich panel 900 between first plate 942 and second plate 944.

Figure 10:
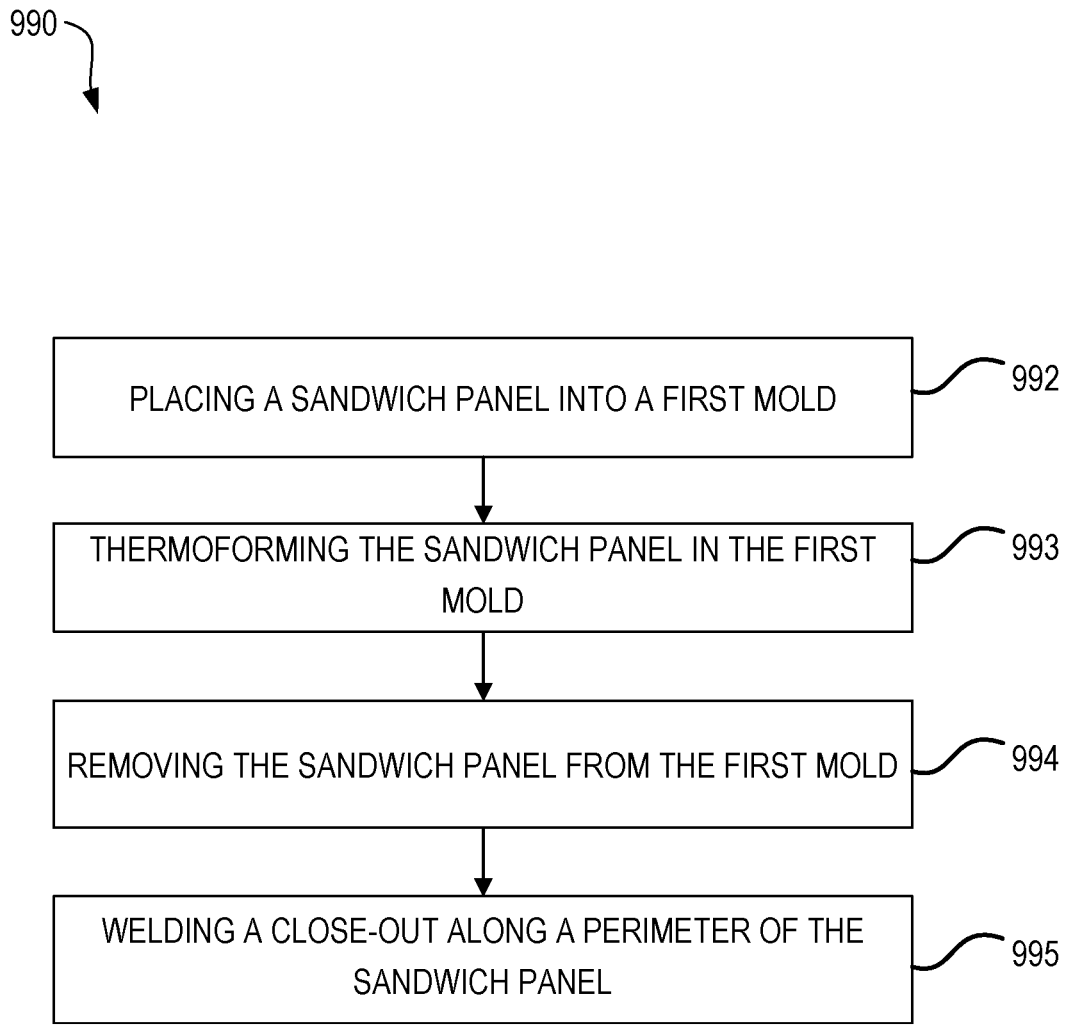
FIG. 10 illustrates a flow chart of a method for manufacturing a thrust reverser blocker door, in accordance with various embodiments.

With combined reference to FIG. 10 and FIG. 9B, step 993 may include thermoforming sandwich panel 900 in first mold 980. Step 993 may include compressing sandwich panel 900 between first plate 942 and second plate 944. In this regard, a force 952 may be applied to first plate 942 thereby moving first plate 942 toward second plate 944. First plate 942 may comprise a contoured surface 943. Second plate 944 may comprise a contoured surface 945. As first plate 942 moves toward second plate 944, the sandwich panel 900 is compressed between first plate 942 and second plate 944, thereby forcing sandwich panel 900 against contoured surface 943 and contoured surface 945. Sandwich panel 900 is thereby deformed (i.e., thermoformed) in response to being compressed between first plate 942 and second plate 944 in accordance with the shape of first plate 942 and second plate 944. In this manner, backsheet 910, facesheet 920, and honeycomb core 930 may be simultaneously deformed during the thermoforming process. In various embodiments, backsheet 910 and facesheet 920 may remain spaced apart from each other during the thermoforming process. In this regard, a gap between backsheet 910 and facesheet 920 around the perimeter 904 of sandwich panel 900 may expose honeycomb core 930.

With combined reference to FIG. 10 and FIG. 9B, step 993 may include applying heat (illustrated by arrows 950) to sandwich panel 900 such that sandwich panel 900 reaches a pliable forming temperature. In various embodiments, the heat is applied to sandwich panel 900 before it is placed between first plate 942 and second plate 944. In various embodiments, the heat is applied to sandwich panel 900 after it is placed between first plate 942 and second plate 944. In various embodiments, the heat is applied by placing sandwich panel 900 into a furnace. However, any suitable method of applying heat to sandwich panel 900 may be used. Sandwich panel 900 may be placed between first plate 942 and second plate 944 before or after the heat is applied thereto. Once cooled, the sandwich panel 900 may retain the shape of the contoured surfaces 943, 945 of first plate 942 and second plate 944, respectively.

Figure 9C:
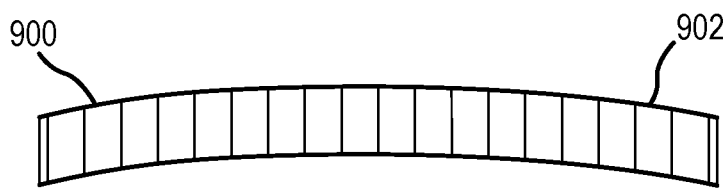
Figure 9D:
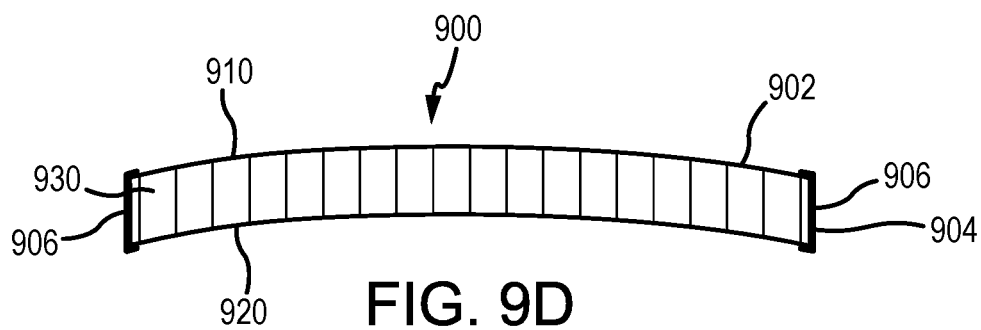

With reference to FIG. 9C, sandwich panel 900 is illustrated after being cooled and removed from the mold, now in the form of a thermoformed blocker door 902. With combined reference to FIG. 10 and FIG. 9C, step 994 may include removing the sandwich panel 900 from first mold 980.

In various embodiments, one or more close-outs 906 may be welded around the perimeter 904 of thermoformed blocker door 902 to enclose honeycomb core 930. In this regard, step 995 may include welding close-out 906 along the perimeter 904 of sandwich panel 900. Close-outs 906 may be made from a thermoplastic material. Close-outs 906 may comprise a "U" shaped channel or ribbon structure extending between backsheet 910 and facesheet 920. Close-outs 906 may extend over backsheet 910 and facesheet 920. Close-outs 906 may be coupled to backsheet 910 and facesheet 920 via a thermoplastic ultrasonic welding process.

In various embodiments, mounting structures may be coupled to thermoformed blocker door 902 via an overmolding process or via fasteners, as described herein. Furthermore, facesheet 920 may be perforated.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for manufacturing a thrust reverser blocker door, comprising:
   molding an unshaped sandwich panel into a single-piece component, the unshaped sandwich panel comprising a facesheet, a backsheet, and a honeycomb core disposed between the facesheet and the backsheet; subsequently thermoforming the unshaped sandwich panel; and
   overmolding a mounting structure onto the backsheet;
   wherein the thermoforming comprises:
   applying heat to the unshaped sandwich panel;
   placing the unshaped sandwich panel into a first mold; and compressing the unshaped sandwich panel to shape in the first mold to form a shaped sandwich panel.

2. The method of claim 1, wherein at least one of the facesheet and the backsheet comprises a first thermoplastic material and the mounting structure comprises a second thermoplastic material;
wherein the first thermoplastic material comprises a continuous fiber reinforced thermoplastic composite material; and
the second thermoplastic material comprises a discontinuous fiber reinforced thermoplastic composite material.

3. The method of claim 2, wherein the overmolding comprises injecting a flow of the second thermoplastic material into a cavity disposed between at least one of the facesheet and the backsheet and the first mold.

4. The method of claim 3, wherein the second thermoplastic material is interdiffused with at least one of the facesheet and the backsheet in response to the flow of the second thermoplastic material being injected into the cavity.

5. The method of claim 2, wherein the overmolding comprises:
removing the shaped sandwich panel from the first mold;
placing the shaped sandwich panel into a second mold; and
injecting a flow of the second thermoplastic material into a cavity disposed between the backsheet and the second mold.

6. The method of claim 5, wherein the second thermoplastic material is interdiffused with at least one of the facesheet and the backsheet in response to the flow of the second thermoplastic material being injected into the cavity.

7. The method of claim 1, further comprising perforating the facesheet.

8. The method of claim 1, further comprising coupling a close-out along a perimeter of the shaped sandwich panel.

9. A method for manufacturing a thrust reverser blocker door, comprising:
molding an unshaped sandwich panel into a single-piece component, the unshaped sandwich panel comprising a facesheet, a backsheet, and a honeycomb core disposed between the facesheet and the backsheet; and subsequently
thermoforming the unshaped sandwich panel;
wherein the thermoforming includes:
applying heat to the unshaped sandwich panel;
placing the unshaped sandwich panel into a first mold; and
compressing the unshaped sandwich panel to shape in the first mold to form a shaped sandwich panel.

10. The method of claim 9, wherein the facesheet, the backsheet, and the honeycomb core are simultaneously deformed in response to the unshaped sandwich panel being compressed in the first mold.

11. The method of claim 9, further comprising perforating the facesheet of the shaped sandwich panel.

12. The method of claim 9, further comprising coupling a close-out around a perimeter of the shaped sandwich panel.

* * * * *